United States Patent
Jaeger

(10) Patent No.: US 9,779,034 B2
(45) Date of Patent: Oct. 3, 2017

(54) PROTECTION KEY MANAGEMENT AND PREFIXING IN VIRTUAL ADDRESS SPACE LEGACY EMULATION SYSTEM

(71) Applicant: LZLABS GMBH, Wallisellen (CH)

(72) Inventor: Jan Jaeger, Wallisellen (CH)

(73) Assignee: LZLABS GMBH, Wallisellen (CH)

( * ) Notice: Subject to any disclaimer, the term of this patent is extended or adjusted under 35 U.S.C. 154(b) by 0 days.

(21) Appl. No.: 15/162,288

(22) Filed: May 23, 2016

(65) Prior Publication Data

US 2017/0168963 A1    Jun. 15, 2017

Related U.S. Application Data

(63) Continuation of application No. PCT/IB2015/059646, filed on Dec. 15, 2015.

(51) Int. Cl.
*G06F 12/02*  (2006.01)
*G06F 12/14*  (2006.01)

(52) U.S. Cl.
CPC .. *G06F 12/1475* (2013.01); *G06F 2212/1052* (2013.01)

(58) Field of Classification Search
CPC .................................................. G06F 12/1475
USPC ... 711/163, 6, 154, 156, 164, 202, 206, 218, 711/221; 703/23; 712/209, 227; 717/138; 718/1, 100, 102
See application file for complete search history.

(56) References Cited

U.S. PATENT DOCUMENTS

| | | | | |
|---|---|---|---|---|
| 4,638,426 A | * | 1/1987 | Chang | G06F 11/073 711/207 |
| 4,792,895 A | * | 12/1988 | Tallman | G06F 12/0284 711/E12.013 |
| 4,945,480 A | * | 7/1990 | Clark | G06F 9/468 711/6 |
| 5,075,842 A | * | 12/1991 | Lai | G06F 12/1475 711/152 |
| 5,075,845 A | * | 12/1991 | Lai | G06F 12/1475 711/152 |
| 5,283,868 A | * | 2/1994 | Baker | G06F 13/387 709/227 |
| 5,560,013 A | * | 9/1996 | Scalzi | G06F 8/52 703/26 |
| 5,577,231 A | | 11/1996 | Scalzi | |
| 5,745,676 A | * | 4/1998 | Hobson | G06F 9/468 711/163 |
| 5,761,734 A | * | 6/1998 | Pfeffer | G06F 12/1072 709/201 |
| RE37,305 E | * | 7/2001 | Chang | G06F 11/073 711/206 |

(Continued)

OTHER PUBLICATIONS

IBM, "z/Architecture Principles of Operation," SA22-7832-10, Eleventh Edition (Mar. 2015); 1732 pages. Mar. 2015.

(Continued)

*Primary Examiner* — Stephen Elmore
(74) *Attorney, Agent, or Firm* — Baker Botts L.L.P.

(57) ABSTRACT

A system is described to provide protection key access control in a system whose operating system and processor were not designed to provide a protection key memory access control mechanism. Such a system can be applied to an emulator or to enable a system that executes native applications to be interoperable with a legacy system that employs protection key memory access control.

10 Claims, 7 Drawing Sheets

(56) References Cited

U.S. PATENT DOCUMENTS

| | | | |
|---|---|---|---|
| 6,745,307 B2* | 6/2004 | McKee | G06F 12/1491 711/163 |
| 7,111,145 B1* | 9/2006 | Chen | G06F 12/109 703/23 |
| 7,200,734 B2* | 4/2007 | Hyser | G06F 12/08 711/203 |
| 7,213,125 B2* | 5/2007 | de Dinechin | G06F 12/1036 711/147 |
| 7,278,030 B1* | 10/2007 | Chen | G06F 12/1466 711/200 |
| 7,330,942 B2* | 2/2008 | de Dinechin | G06F 12/109 711/152 |
| 7,409,487 B1* | 8/2008 | Chen | G06F 12/1036 711/209 |
| 7,421,689 B2* | 9/2008 | Ross | G06F 9/45533 712/1 |
| 7,490,216 B1* | 2/2009 | Chen | G06F 12/109 711/202 |
| 7,509,639 B2* | 3/2009 | Worley, Jr. | G06F 9/468 713/164 |
| 7,543,290 B2* | 6/2009 | Kagan | G06F 12/1466 709/245 |
| 7,886,127 B2* | 2/2011 | Chen | G06F 12/109 711/202 |
| 7,908,646 B1* | 3/2011 | Chen | G06F 9/45537 711/163 |
| 7,996,833 B2* | 8/2011 | de Dinechin | G06F 8/65 718/1 |
| 8,010,763 B2* | 8/2011 | Armstrong | G06F 12/1475 711/153 |
| 8,091,090 B2* | 1/2012 | de Dinechin | G06F 9/30101 718/1 |
| 8,219,988 B2* | 7/2012 | Armstrong | G06F 12/1475 711/170 |
| 8,219,989 B2* | 7/2012 | Armstrong | G06F 12/1475 711/170 |
| 8,225,071 B2* | 7/2012 | Chen | G06F 12/109 711/202 |
| 8,495,632 B2* | 7/2013 | Armstrong | G06F 12/1475 711/170 |
| 8,645,974 B2* | 2/2014 | Armstrong | G06F 12/1475 718/1 |
| 9,052,990 B2* | 6/2015 | Maria Joseph | G06F 12/1491 |
| 9,317,453 B2* | 4/2016 | Armstrong | G06F 9/45558 |
| 2003/0084256 A1* | 5/2003 | McKee | G06F 12/1475 711/152 |
| 2006/0036830 A1 | 2/2006 | Dinechin | |
| 2013/0262790 A1* | 10/2013 | Menyhart | G06F 12/08 711/152 |
| 2014/0089450 A1* | 3/2014 | Raindel | G06F 3/061 709/213 |
| 2014/0366019 A1* | 12/2014 | Bajaj | G06F 9/461 718/1 |
| 2015/0106599 A1 | 4/2015 | Gainey, Jr. et al. | |
| 2015/0278084 A1* | 10/2015 | Bybell | G06F 12/1063 711/205 |
| 2015/0278085 A1* | 10/2015 | Bybell | G06F 12/1063 711/205 |
| 2016/0110298 A1* | 4/2016 | Koufaty | G06F 12/1466 726/28 |
| 2016/0378530 A1* | 12/2016 | Ramasubramanian | G06F 9/45558 718/1 |

OTHER PUBLICATIONS

PCT International Search Report and Written Opinion for International Application No. PCT/IB2015/059646, mailing date Apr. 8, 2016, 10 pages. Apr. 8, 2016.

* cited by examiner

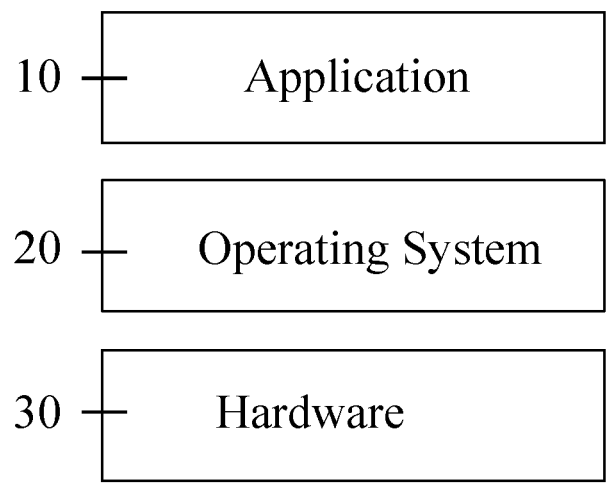
FIG. 1 - PRIOR ART
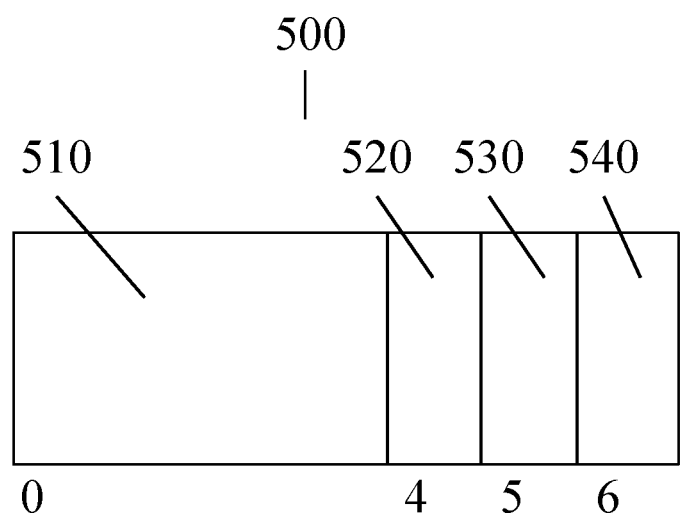
FIG. 5A - PRIOR ART

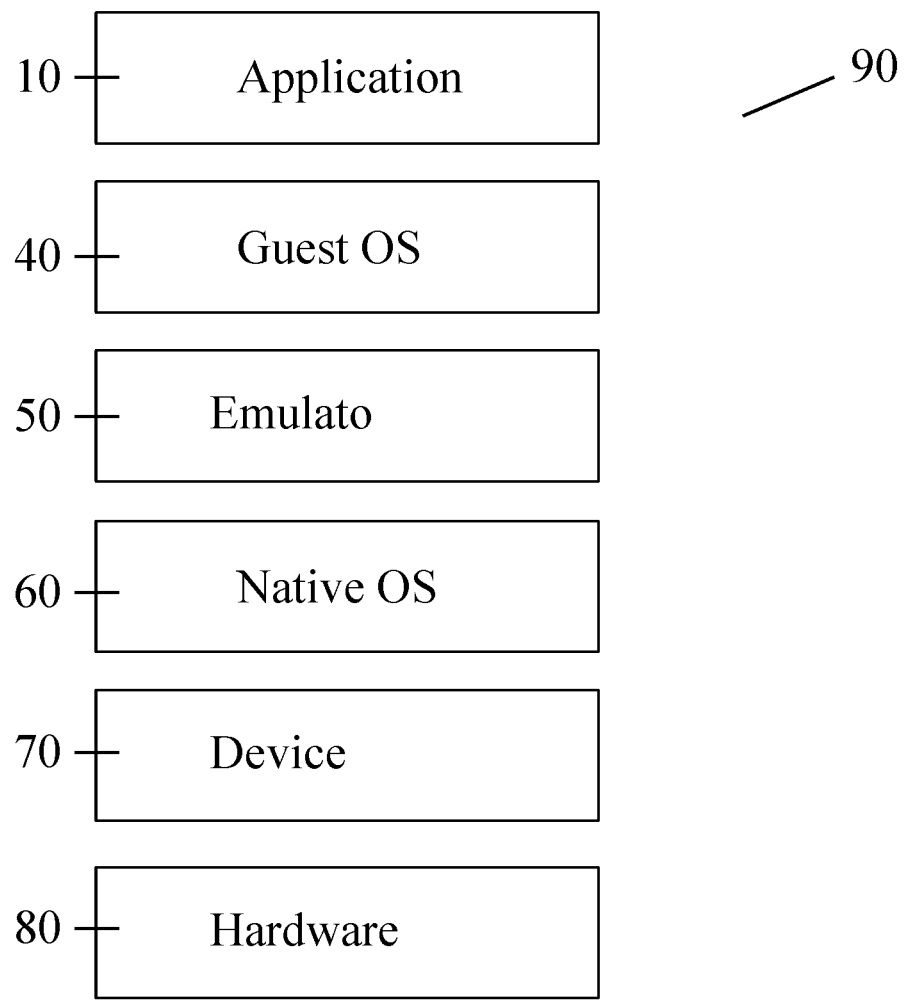
FIG. 2 - PRIOR ART

PROTECTION KEY MANAGEMENT AND PREFIXING IN VIRTUAL ADDRESS SPACE LEGACY EMULATION SYSTEM

CROSS-REFERENCE TO RELATED APPLICATION

This application is a continuation of International Application Number PCT/IB2015/059646 filed Dec. 15, 2015 which is incorporated herein by reference.

TECHNICAL FIELD

The present invention relates to techniques for implementing protected memory access and particularly to the implementation of storage protection keys in systems whose processors and operating systems do not support storage protection keys.

BACKGROUND

An important limitation of computer systems is that a given compiled program can only run under the operating system and machine instruction set for which it was compiled. This is true because compiled programs are written to a particular instruction set (i.e. instructions that the system recognizes and can execute), with a known set of registers, and the ability to carry out input/output operations by making calls to a known operating system. For example, as illustrated in FIG. 1, a compiled application (10), is configured to execute on a particular platform including a particular operating system (20), and hardware platform (30). Such operating systems (20) and hardware platforms (30) may be of varying degrees of complexity. But, if one wishes to run the application in an environment that implements a different set of hardware instructions, or under an operating system with differing function calls, typically the application program must be recompiled. This restriction limits the ability of computer programs to operate in a heterogeneous environment.

To extend a computer program from one platform to another, a cross compiler, may be used to recompile the program so that it will run natively on a different hardware platform. However, in many situations it is undesirable to recompile source code. Recompiling may result in errors, changes in system performance, or changes in system behavior. Resolving these issues may require changes to the original source code, which fragments the code base and increases management complexity. Additionally, the source code for a particular application may not always be available, placing further restrictions on the ability to operate a given program on a different platform.

One approach to address this problem is to use emulated systems, which run on a target platform but emulate the behavior of a different (e.g. legacy) platform. FIG. 2 depicts such an emulated system. The emulated system (90) typically includes a target hardware platform (80), suitable device drivers (70), and a native operating system (60). To simulate a legacy system environment, an emulator (50) is provided that includes instruction handling routines that translate instructions for one architecture into corresponding sets of instructions for the target architecture. In execution, the emulator invokes native operating system (60) functions and runs on the target hardware (80) to simulate the behavior of a legacy hardware system. If a guest operating system (40) of the legacy platform is installed in the emulated system, a compiled application program (10) can execute in the emulated environment, unaware that it is actually running on a different platform. Examples of legacy, mainframe computers include IBM mainframes running OS/360™, System/370™, System/390™ or ESA/390™, and system/Z (International Business Machines Corp. NY, US).

Emulators for various hardware platforms are known. For example, Hercules is an emulator that allows an X86 machine running LINUX® (Linux Foundation, CA, US), WINDOWS® (Microsoft Corp. WA, US), SOLARIS® (Oracle America, Inc., CA, US), or the OS X® (Apple Inc., CA, US) operating system to imitate mainframe System/370, ESA/390, and z/Architecture hardware. Using a hardware emulator such as Hercules a mainframe operating system such as MVS® ((International Business Machines Corp. NY, US), OS/360™ or the like may be installed, thus providing a mainframe environment on a different platform. Applications including executable load modules that were compiled to run on a legacy platform under a legacy operating system may thus run in an instance of that operating system installed on the hardware emulator.

This conventional emulation approach may suffer from reduced performance due to the multiple layers of translation required to execute the software. In particular, such emulation systems typically must not only determine the virtual guest addresses accessed by guest programs running in emulation, but also emulate dynamic address translation and prefixing to emulate real addresses and absolute system addresses respectively. In addition, in order to run the application, a copy of the operating system must be installed and validated for use on the emulated machine.

An address space is a consecutive range of integer numbers that correspond to byte locations in computer storage. A real address or physical address refers to the address of a location in physical memory. An absolute address is a physical address that refers to the address of a location in system memory. Systems that employ prefixing translate real addresses to absolute addresses. A virtual address, on the other hand is converted into a physical address by means of an address translation mechanism. Dynamic address translation (DAT), is one such mechanism as is known in the art of memory addressing.

Current 64 bit processors support a 256TiB virtual address space (with a theoretical maximum of 16EiB). Paging is a technique that allows each process to see the full virtual address space, without actually requiring the full amount of physical RAM to be physically installed. In fact, many current implementations have a physical RAM limit of 1TiB and a theoretical limit of 4PiB of physical RAM. In addition, to accommodating a reduced amount of physical RAM, paging introduces the benefit of page-level protection. Such systems can provide hardware isolation because user-level processes can only see and modify data which is paged in to their own address space. System pages can also be protected from user processes. In the case of a 64 bit x86 architecture, page-level protection now supersedes segmentation as the memory protection mechanism. In such a system, the memory management unit or MMU is a unit that transforms virtual addresses into physical addresses. The MMU typically performs this memory mapping transformation through the use of two tables the paging directory, and the paging table.

In one example of an Intel implementation, both tables comprise 1024 8-byte entries. In the page directory, each entry points to a page table. In the page table, each entry points to a physical address that is then mapped to the virtual address found by calculating the offset within the directory and the offset within the table. This can be done as the entire table system represents a linear 4 GB virtual memory map.

FIG. 3A depicts an example of a page directory entry. The page table 4-KB aligned address found in bits 12-63 represents the physical address of the page table that manages the four megabytes at that point. It is important that this address be 4K aligned, as the lower order bits contain the values of access bits and are not part of the address. Bits 9-11 are available for use by the system programmer. Bit 8, labelled G for 'Global' is ignored. Bit 7, labeled "S" for 'Page Size' stores the page size for that specific entry. If the bit is set, then pages are 4 MB in size. Otherwise, they are 4 KB in size. Bit 6, denoted with a "0" is reserved for future use and is set to the value "0." Bit 5, labeled A for 'Accessed' is used to indicate whether a page has been read or written. This bit is set by the MMU whenever the page is accessed. Bit 4, labelled D for 'Disabled' is the cache disable bit. If the bit is set, the page will not be cached. Bit 3, labelled 'W' for 'Write-Through' indicates whether write-through caching is enabled. Bit 2, labeled U for 'User/Supervisor' controls access to the page based on privilege level. If the bit is set, then the page may be accessed by all processes. If the bit is not set, then the page may only be accessed by supervisor processes. In the case of a page directory entry, the user bit controls access to all the pages referenced by the page directory entry. Therefore, if it is desired to make a page accessible to a user process, the user bit must be set in the relevant page directory entry as well as in the page table entry. Bit 1, labelled R for 'Read/Write' is the read/write permissions flag. If the bit is set, the page is a read/write page. Otherwise, when the bit is not set, the page is a read-only page. The WP bit in CR0 determines if this is only applied to user processes, allowing the kernel write access in the default setting, or whether the R bit setting controls access by both user and kernel processes. Bit 0, labelled P for 'Present' indicates that the page is resident in physical memory when set, or that is not present in physical memory when not set. If the bit is clear, then a page fault will occur upon a reference attempt.

FIG. 3B depicts an example of a page table entry. The page table entries are very similar to page directory entries, with the following exceptions: Bit 8, labeled G for 'Global' prevents a look aside buffer from updating the address if it is cached and CR3 is reset. The address will remain valid regardless of the CR3 setting. Bit 7 of the page table entry is reserved, rather than bit 6, which was reserved in the case of the page directory entry. Bit 6, labeled D for 'Dirty' indicates that the page has been written. Bit 5, labeled C for 'Cache Disabled' in the page table entry performs the same function as bit 4 labeled D in the page directory.

In a legacy mainframe environment, each process is assigned a virtual address space. A given process may initiate multiple tasks, and tasks operating under a common process operate in the same virtual address space.

Mainframe CPUs typically store a portion of their state information in block 0, or in storage locations corresponding to 0-4095 bytes. To allow multiple processors to share the same physical memory more easily, such systems often employ a technique known as prefixing which allows real addresses in the range of 0-4095 to correspond to different locations in real memory for each CPU, while the remaining real addresses will be the same. Prefixing thus converts the real addresses, which denote the locations in real storage of the processor into absolute addresses, which are physical addresses assigned in main system storage. This permits each processor to have its own prefix storage area for storing the current program status word, old program status word, and other state information. The size of the prefix area may vary. For example, some sixty-four bit systems assign a prefix area to addresses corresponding to locations 0-8191.

An important function of the MMU is to prevent a process or task from accessing memory that has not been allocated to that process or task. An attempt to access memory that has not been allocated results in a hardware fault, which is intercepted by the Operating System, often called a segmentation fault, which causes generally termination of the process. As further protection against unauthorised storing of data into memory, mainframe systems implement a concept of storage keys to control access to memory. Each contiguous 4 k block of memory or page frame has an associated storage key. The storage keys are stored in a table in a reserved space in system memory. Only tasks that have the required storage access key, or tasks that have a storage access key of zero, are given complete access to the block.

The storage keys are typically stored in a table that has a control byte associated with each 4 KB block of memory. In a mainframe system, such as the System/360™, System/390™, or System/Z architecture, the storage key is associated with a physical memory address. More specifically, for each physical page of memory, there is a control byte storing the storage key, and there are as many storage keys as there are 4 k byte blocks in memory. In a mainframe system, the control byte typically includes seven bits of a one-byte field including a four-bit storage key, a protect bit, and two bits used to record changes and references respectively. FIG. 5A depicts an example of the seven bits of the control byte (500), with the four-bit key 510 stored in bits 0-3, the protect bit 520 stored in bit 4, the change bit 530 stored in bit 5, and the reference bit 540 stored in bit 6. If the fetch bit of a given control byte is set to zero, only write accesses are protected, and a task operating with any protection key is permitted to read the block. If the fetch bit is set to one, protection applies to both reads (fetches) and write accesses (stores) to the block.

In a system that encodes the protection key in four bits, there are 16 protection keys numbered zero to fifteen. The protection key associated with a given task is stored in the program status word (PSW), also referred to as the storage access key. In operation, the system checks the storage access key against the storage key and the access control bits stored in the control byte for a block of memory to determine whether access is permitted. When the storage key does not match the access control bits, storage protection logic will return, interrupt the task, and initiate a protection exception. Storage key value zero is a special case. When a task operates with an access key value of zero, access is permitted whatever the value of the storage key in system memory for that address. Typically, only memory areas that are reserved for use by the operating system are assigned a storage key value of zero.

The storage keys in the control bytes of such a system are under the control of the operating system, which stores and modifies the bits in each entry as a page of data is copied into physical memory, or is accessed or modified by a process or task. Many user tasks access only key number eight, but the use of multiple storage keys associated with a given task is supported, and takes place, for example, under CICS, which typically uses key number nine. Most system processes operate under key zero Storage keys are unlike ring systems not hierarchical, the storage key of zero is a 'master key' which always grants access, non-zero storage keys are unique and their value has no specific meaning other then being unique. Preferably, in a system that uses storage keys, each memory address is assigned a single key.

Systems that emulate mainframe operations typically do so on a target processor that has a different instruction set than that of the mainframe system. Such target processors do not provide hardware support for key-controlled access to storage. Therefore, in a system that emulates mainframe operations on an x86 architecture, it would be desirable to emulate the operation of the storage keys. At the same time, prior-art emulation systems such as the Hercules emulator implemented emulation the DAT of virtual addresses to real addresses, and subsequently implemented the emulation of the management of physical addresses. The implementation of emulated dynamic address translation introduces complexities in the emulation of key-controlled access to storage, and limits system performance due to the need to perform multiple emulated table lookups.

In order for a program that was compiled to run on first architecture to be enabled to run on a different target architecture, another alternative is to translate the program be decompiling the object code, and then recompiling it to run on the target architecture. Though various decompilers are known, the decompilation and recompilation of object code from one platform is difficult because it is not generally possible for a decompiler to identify and separate computer instructions from data with the certainty required for the recompiled program to accurately reproduce the behavior of the original program. However, where decompilation and translation are applied to a set of programs whose code and data can be correctly identified, such as programs output by a known compiler or initially compiled with a known set of flags or settings, decompilation of code compiled to run on a first architecture, and recompilation of the decompiled code to create executable code for a target platform presents an alternative to emulation. In one example, a load module compiler that receives as input, a relocatable cobol load module compiled to run on an IBM mainframe is received as input, and an executable object program adapted to run on an x86 machine is generated as output.

SUMMARY

An emulated system that provides support for key-controlled access to storage, without the added overhead of emulated dynamic address translation is described. In addition, it would be beneficial for an emulated system to execute multiple tasks that would be associated with multiple processors without the overhead associated with saving and restoring the prefix area in response to interrupts or context switches between tasks. A system that employs a load module compiler translate load modules that are executable on a mainframe into executable code for an alternative platform is also described, in which the system provides support for key-controlled access to storage in order to make the executable generated by the load module compiler interoperable with mainframe systems or emulated systems that employ key-controlled access to storage.

In one embodiment, the invention provides a computing system having a processor not adapted to support protection key memory access control, the processor including a memory management unit (MMU) and executing an operating system that manages virtual memory, the processor adapted to execute user processes and tasks. The system may be used for a method of implementing protection key memory access control by assigning to each process, a contiguous range of virtual address memory and a storage key to each 4 k block in the contiguous address space, assigning a storage access key to each task in the process, initiating execution of a task using a specfic access key by assigning a virtual address mapping to that task with its assigned access key, assigning a virtual address mapping to the task for the assigned storage key. In response to a subsequent memory access by said task, if the subsequent memory access uses an access key different from access keys previously used by said task, determining whether the said task is authorized to use said different access key, and if the second task is authorized, assigning a subsequent virtual address mapping to the task and key. In response to a command to allocate or to free storage by the task, setting control bytes including setting the storage key data and an indicator that the page associated with each control byte is valid. Upon execution of a computer instruction of said task using the access key, the method further includes generating a virtual address in the address space associated with the task, determining whether the first address lies within the range of addresses associated with the first process, if the address lies within the range of addresses associated with the first process, generating by the MMU a segmentation fault indicating that the page corresponding to the virtual address is not present in physical memory or that the task is attempting to write to a page that is present in memory with a read only access permission setting, verifying by an exception handler that said access key value is zero or that said task is authorized to access the virtual address using the access key, upon said verifying an exception handler, changing the native protection settings associated with the page of data comprising said guest virtual address in the MMU to allow access to the virtual address, and subsequently retrying the instruction, and allowing by the MMU, the instruction of said task to access virtual addresses in said page of data.

In additional embodiments of the method, which may be combined with one another and with the embodiment above, the task includes a second task of said process, prefix data associated with the first and second tasks is stored at the same logical address, but in different physical addresses, changing includes setting the value of bit zero of the corresponding page table entry to indicate that the physical page is present in memory, and the method may further include invoking the MPROTECT( ) function to change the native protection setting.

Embodiments of the invention further provide a computing system that may be able to implement any of the above methods. The computing system includes a processor not adapted to support protection key memory access control, the processor including a memory management unit (MMU) and executing an operating system that manages virtual memory, the processor adapted to execute user processes and tasks and a non-transient memory storing instructions which, when executed on the processor, cause the processor to assign to a process, a contiguous range of virtual address memory and a storage key to each 4 k block in the contiguous address space, assign a storage access key to each task in the process, initiate execution of a task using a specific access key by assigning a virtual address mapping to that task with its assigned access key. assign a virtual address mapping to the task for the assigned storage key, in response to a subsequent memory access by said task, if the subsequent memory access uses an access key different from access keys previously used by said task, determine whether the said task is authorized to use said different access key, and if the second task is authorized, assign a subsequent virtual address mapping to the task and key, in response to a command to allocate or to free storage by the task, set control bytes including setting the storage key data and an indicator that the page associated with each control byte is valid, and upon execution of a computer instruction of said task using the access key, generate a virtual address in the address space associated with the task, determine whether the first address lies within the range of addresses associated with the first process, if the address lies within the range of addresses associated with the first process, generate by the MMU a segmentation fault indicating that the page corresponding to the virtual address is not present in physical memory or that the task is attempting to write to a page that is present in memory with a read only access permission setting, verify by an exception handler that said access key value is zero or that said task is authorized to access the virtual address using the access key, upon said verifying an exception handler, change the native protection settings associated with the page of data comprising said guest virtual address in the MMU to allow access to the virtual address, and subsequently retry the instruction, and allowing by the MMU, the instruction of said task to access virtual addresses in said page of data.

In additional embodiments of the system, which may be combined with one another and with the embodiment above, the task includes a second task of said process, the prefix data associated with the first and second tasks are stored in the same logical address, but in different physical addresses, changing the native protection settings includes setting the value of bit zero of the corresponding page table entry to indicate that the physical page is present in memory, and the system further includes an MPROTECT( ) function in the operating system of said system, operable to change the native protection setting.

BRIEF DESCRIPTION OF THE DRAWINGS

For a more complete understanding of the present disclosure and its features and advantages, reference is now made to the following description, taken in conjunction with the accompanying drawings, in which:

FIG. 1 is a schematic representation of a prior art application, operating system, and hardware;

FIG. 2 is a schematic representation of a prior art emulated system;

FIG. 5A is a schematic representation of a prior art control byte;

DETAILED DESCRIPTION

Figure 4A:
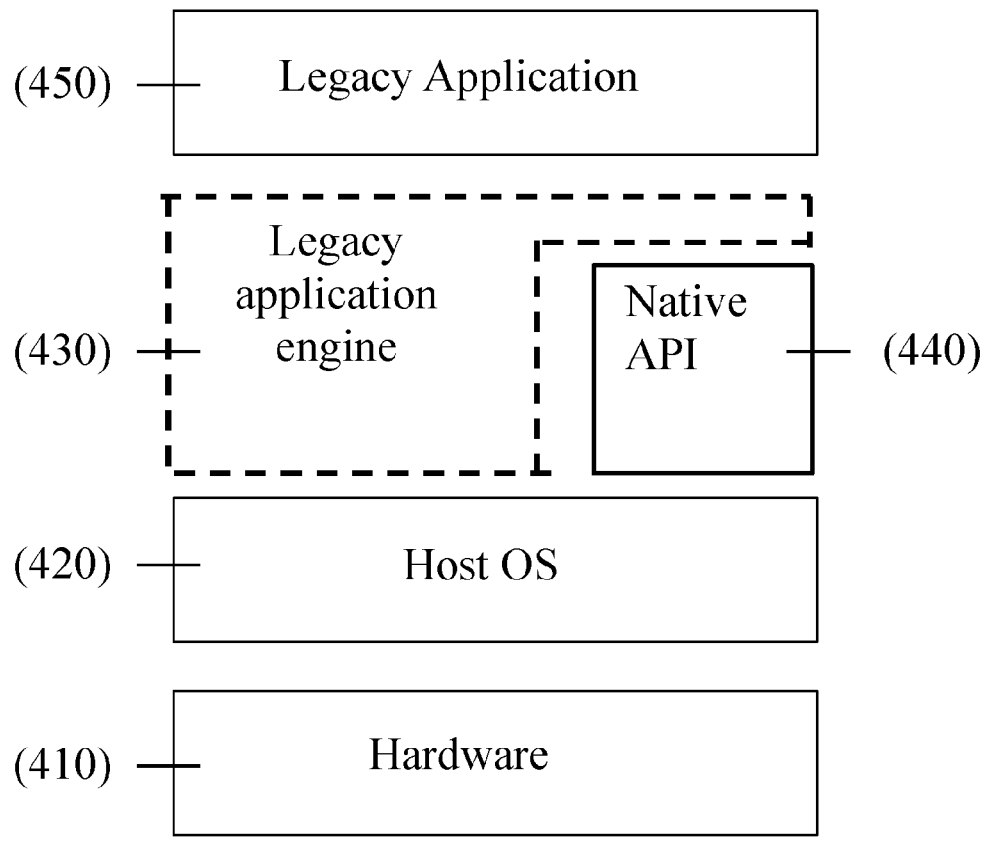
FIG. 4A is a schematic representation of an appliance according to an embodiment of the present invention.

As indicated in FIG. 2, emulation systems may provide a facility for the installation of a guest operating system (40) to execute, in order to support the execution of guest applications. In one aspect of the inventive system, an appliance is provided including a legacy application engine is constructed to enable execution of a guest application without employing a guest operating system. FIG. 4A illustrates one embodiment in which an x86 computer or compute blade (410) is configured and runs a target operating system (420). In one example, the target operating system is LINUX®. A set of native APIs (440) are further provided to enable the rapid execution of emulated instructions. These native APIs are invoked by a legacy application environment (430), which is adapted to emulate the behavior of the guest system (not shown), enabling a legacy or guest application to run on the appliance. In one embodiment, the legacy application environment is made up of a legacy operating engine module (432), which operates as a container for processes, and a legacy hardware environment module (435), which implements memory management and other hardware emulation functions.

Figure 4B:
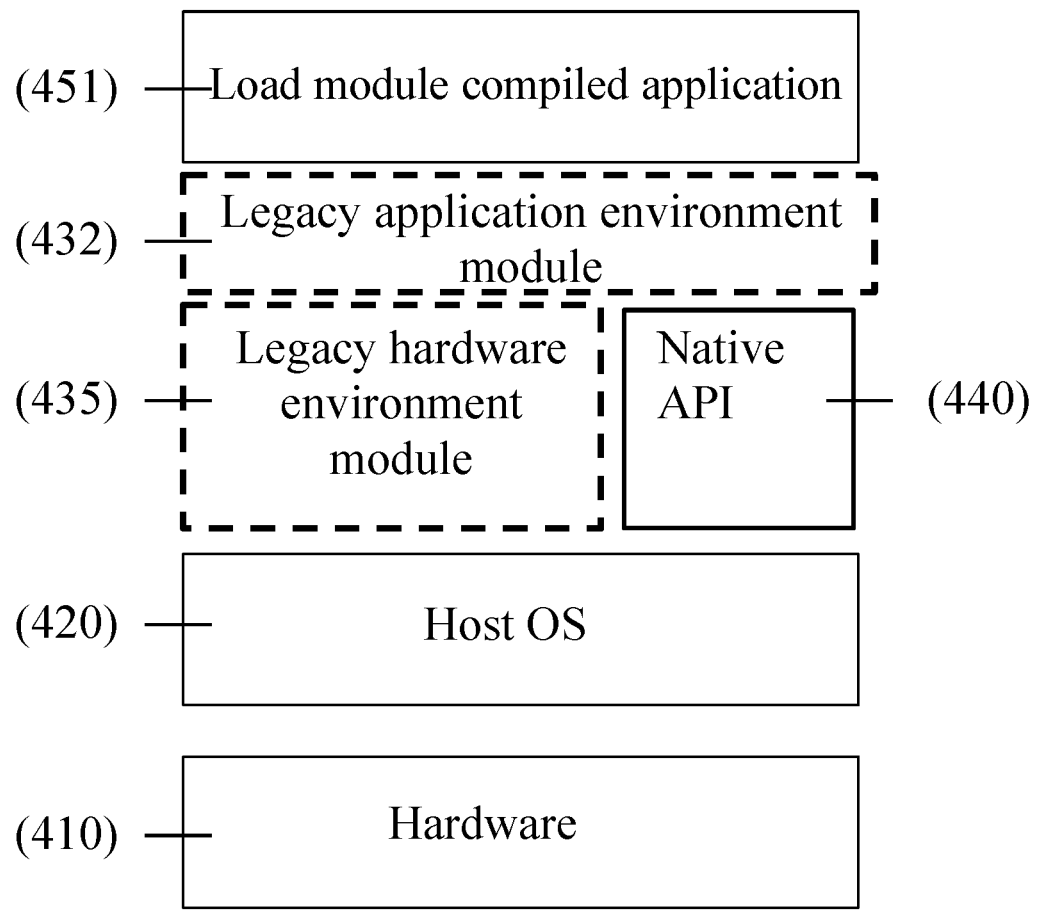
FIG. 4B is a schematic representation of the relationship between modules that have been recompiled into a load module compiled application for use in the appliance of FIG. 4A.

FIG. 4B illustrates the relationship between modules in the case of a legacy application that has been recompiled using the load module compiler into a load module compiled application (451). As with emulated tasks or processes, a load module compiled application (451) operates in the container provided by the legacy operating environment module (432). The application can invoke native APIs (440) and the legacy hardware environment module (435), which implements memory management functions. Unlike the legacy application of FIG. 4A, the load module compiled application (451) does not make legacy hardware calls that correspond to the legacy platform, as it has been compiled to execute on the target architecture.

The virtual address space of a process running on a legacy mainframe system is typically 2 GB, which corresponds to 31 bits to address the space. Because it would be too expensive to allocate the full address space worth of physical memory to each process, virtual memory typically divides physical memory into smaller amounts of physical memory, typically 4K, but other amounts are also used. Indeed, such mainframe systems typically operate with a total physical memory that is much smaller than the 2 GB limit for the virtual address space. In operation, such legacy systems perform DAT to convert virtual memory addresses to physical addresses that are used to access physical storage devices. Virtual memory also enables the sharing of protected memory space, the automatic management of a computer memory hierarchy, and facilitates the loading and execution of programs.

An emulator generally refers to hardware or software that allows one system to behave in accordance with the specifications of another system. For example, an emulator will permit software that is designed to run on a so-called guest system to run on a host system, which may incorporate hardware of a different design or architecture. Emulation systems that enable software that designed to run on a mainframe guest system, to instead operate on a different computer system are known. Such emulators typically emulate the hardware of the underlying mainframe system, in order for the emulation system to replicate hardware features of the guest system on the target architecture. In the case of memory management, such hardware emulators typically emulate physical memory, and would therefore emulate dynamic address translation behaviors.

In accordance with one embodiment, an emulation system emulates a 2 GB virtual address space associated with the virtual address space of a mainframe, without emulating the underlying physical storage. The emulation system may be implemented on a native machine whose hardware and operating system support larger address spaces. In a preferred embodiment, a 64-bit processor, with word size and memory address width of 64-bits, and a 64-bit operating system that uses 64-bit virtual memory addressing is employed. A person of ordinary skill in the art would recognize that an emulation system could be implemented with processors having other word size, address bus width, or with operating systems employing other numbers of bits for virtual addresses.

In accordance with one embodiment, each task or process in the emulated system is assigned a distinct set of mappings to the 2 GB address space. In a preferred embodiment, each task is assigned a distinct mapping for each storage key associated with the task or process. Preferably, when storage is allocated to the task, a storage allocation routine changes the bits in the control block indicating that a particular page can be accessed by a given key. In one example, the eighth bit of the control byte is reserved for future use. In another implementation, bit eight may be used to indicate whether a page is presently valid because it has been acquired through a memory allocation routine such as malloc or getmain. In this embodiment, the eighth bit of the control byte holding the storage key contains a valid/invalid bit that can be set by the storage allocation routine to indicate that a particular page of virtual address space has been allocated. If the page is deallocated, a routine will similarly set the valid/invalid bit to indicate that the page is no longer allocated.

In such a system, each task or process would be assigned from one to sixteen different address mappings. In one embodiment, the emulation system runs under the LINUX® operating system on an x86 processor and emulates the operation of storage keys to control access to virtual storage in an S390 mainframe system. The LINUX® function MPROTECT( ) changes the protection in the MMU status for a calling process's memory pages. If a calling process attempts to access memory in a manner that violates the protection, the kernel generates a SIGSEGV signal for the process.

Figure 5B:
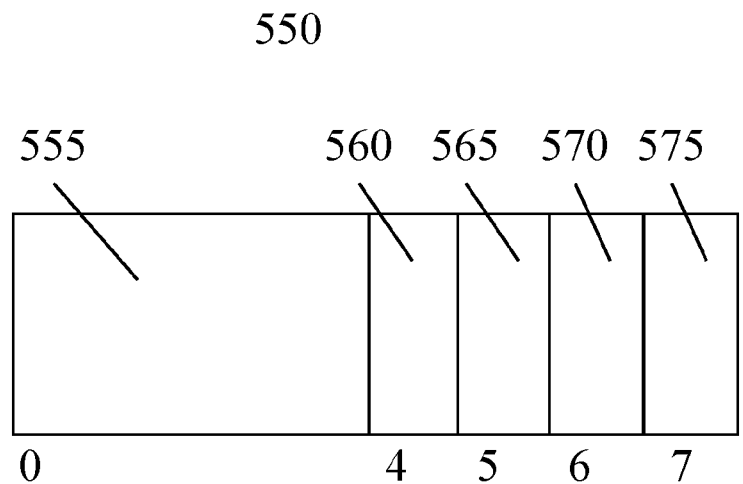
FIG. 5B is a schematic representation of a control byte that may be used with embodiments of the present invention.

In one example, the storage protection bits are stored in a control byte, together with a valid/invalid bit indicating that a particular memory address has been. FIG. 5B depicts an example of the eight bits of the exemplary control byte (550), with the four-bit key 555 stored in bits 0-3, the protect bit 560 stored in bit 4, the change bit 565 stored in bit 5, and the reference bit 570 stored in bit 6, and a valid/invalid bit 575 stored in bit 7. The use of a single byte should be understood to be exemplary, as the control information could be stored in a control word of different size, or in non-contiguous bits in other storage locations.

Figure 3A:
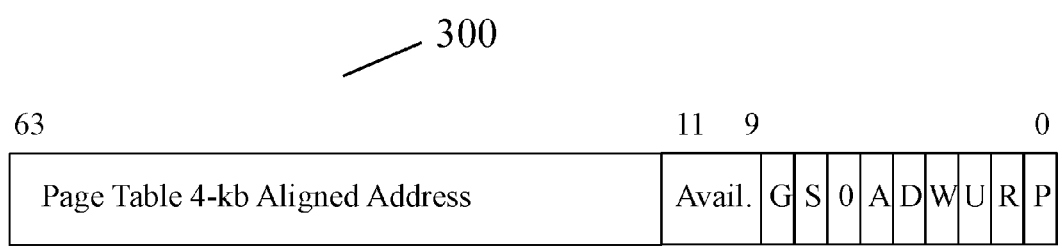
FIG. 3A is a schematic representation of a page directory entry that may be used with the prior art or with embodiments of the present invention.
Figure 3B:
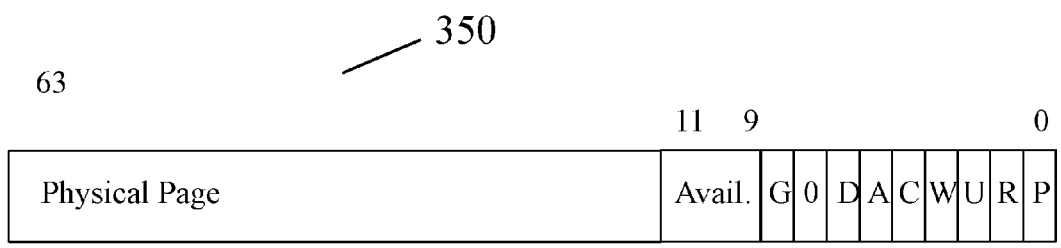
FIG. 3B is a schematic representation of a page table entry that may be used with the prior art or with embodiments of the present invention.
Figure 6:
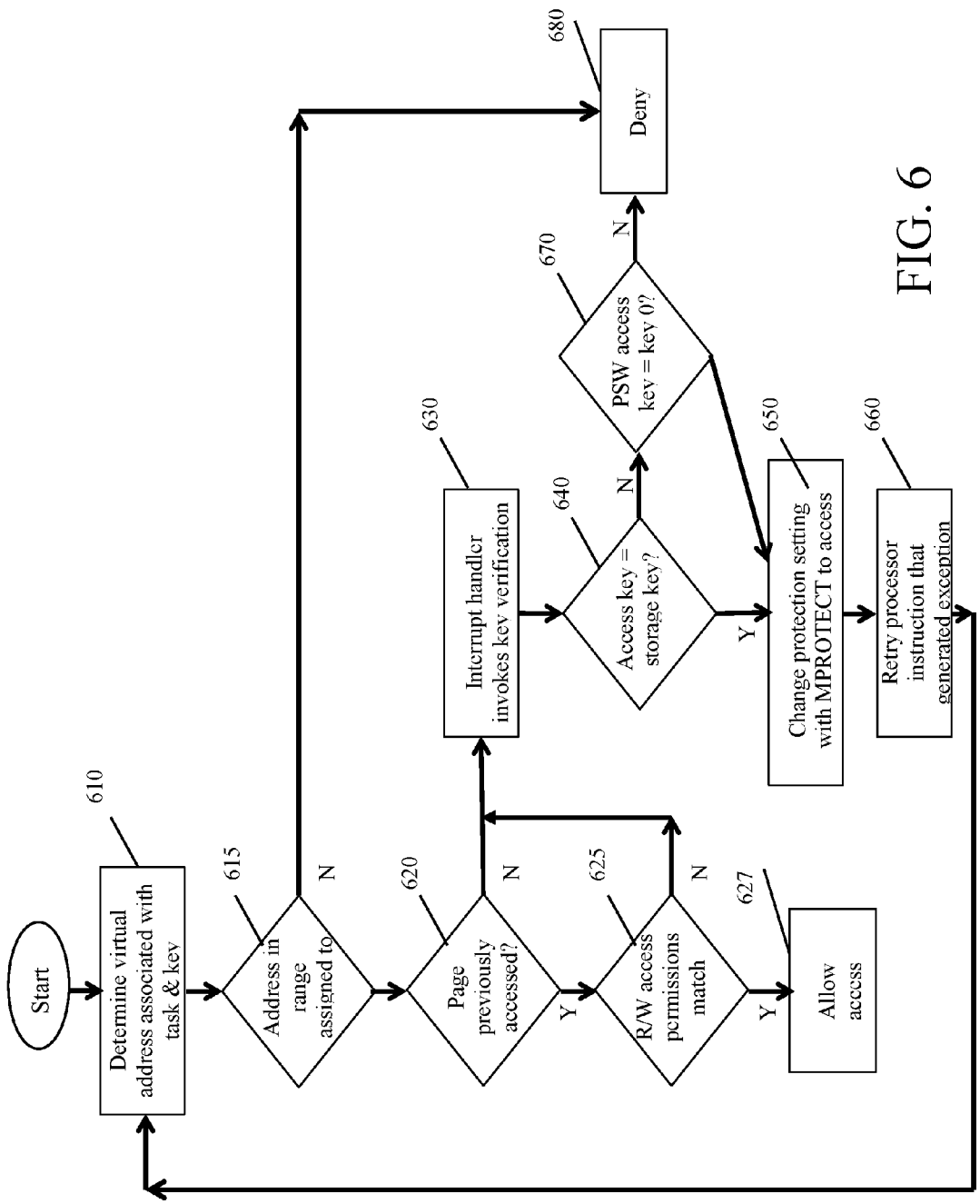
FIG. 6 is a flow chart of the operation of a system according to an embodiment of the present invention.

A description of the operation of the system is made with reference to FIG. 6. In accordance with one embodiment, the physical page settings (FIG. 3B) in the MMU for all pages of data are initially set to prohibit access. For example, the Present bit (bit 0) for the corresponding page table entry will be set to "0" indicating that the page is not present in memory. In operation, when a task or process operating in emulation executes an instruction to a virtual legacy memory address, the system first determines the specific virtual address associated with the task operating under the given storage key, as indicated at 610. The system then checks whether the address lies within a range of addresses assigned to the task. If the address is not within a range of addresses assigned to the process (615), access is denied (680). If the address lies within a range assigned to the process, the system then determines whether or not the page has already been accessed 620. In the event of a first access, the page has not previously been accessed, the access control bits of the physical page are zero, where the MMU will prohibit access and and the kernel generates a SIGSEGV signal. Though the example implementation described below uses the LINUX® MPROTECT( ) operation to set the access control bits of the physical page and signal the MMU that the access bits have changed in response to detecting that the page is not present, in a different system, a different signal to detect a segmentation fault, and a different routine to change the state of a page from not-present to present could be used in accordance with the invention. In the event that the page was previously accessed, read/write access permission is verified. If write access is sought for a page for which only read access has been set, control returns to the interrupt handler as indicated (625). If read/write access permissions match (625), then access is permitted (627).

In one embodiment of the invention, the interrupt handler of the LINUX® system on which the emulator runs is modified to include a key verification routine, and the key verification routine is invoked 620. The key verification routine that compares the storage access key associated with the current task to the storage key 555 in the control byte 550 of the storage key table to see whether the keys are equal 640. In one embodiment, the protection key associated with the current process is maintained by legacy operating environment (432) in a data structure containing registers, keys, control blocks, prefix information, and other context information. If the key verification routine finds that the access key is the same as the storage key, access should be permitted and the routine changes the native protection status associated with the storage logical address 650. In one example under the LINUX® operating system, the MPROTECT( ) operation is used to set the protection status from PROT_NONE to PROT_READ, or PROT_WRITE. The MPROTECT( ) operation in this example will set the Present bit (bit 0) of a corresponding page table entry to "1", and will set the Read/Write bit (bit 1) to zero or one. In one embodiment, the emulator implements a tri-state table, and changes the setting to PROT_WRITE though additional protection states could be supported. The Present bit for the corresponding page table entry is also changed from "0" to "1" to indicate that the page is now present. At this time, the emulation system retries execution of the processor instruction 650 that initially caused the segmentation fault.

If the key verification routine determines that the key does not match, it then checks to see whether the access key is key zero 670. Because key zero is typically used for system operations, if the access key is zero, the emulator proceeds to step 650 and changes the native protection setting to allow system access. If the key does not match and the key is other than key zero, then the system denies access 680, and the emulation system does not execute the instruction, and the emulation system emulates a storage protection exception.

Subsequent accesses to the same virtual address by the same task or process running on the emulator operate in an accelerated fashion. When the virtual address associated with the task and key is determined, the system sees that the page has previously been accessed 620 because there is no segmentation fault and no SIGSEGV signal. Preferably, the MMU checks the state of the Protect bit (bit 0) of the page table entry corresponding to the requested page to see whether the page is already present in memory. If the page is present, this means that key verification was previously performed for this task accessing this address using this particular storage key. Thus, access under the protected storage key is permitted because the permission settings were previously verified. Repeated accesses to a page that is present experience reduced overhead, as the key verification need not be performed repeatedly while the page remains present in memory. Tasks or processes operating in emulation in this fashion will experience a considerable performance improvement due to the elimination of exception handling, context switching, and table lookup steps that would otherwise be performed for each access.

If the same task or process subsequently executes an instruction that accesses the same location in virtual mainframe storage, but does so using a different storage access key, the system will determine a different virtual address 610 because there is a distinct address mapping associated with each task and storage access key. Under this condition, if the access to virtual storage using the different access key is the first such access using the key, the emulator will again experience a segmentation fault, invoking the key verification routine and, if the access key matches the storage key 640, invoke the MPROTECT( ) operation 650 to change the protection status of the page. If access is not permitted under the different storage key, then the instruction will not execute in emulation, and the emulator will emulate and log the appropriate exception.

Figure 7:
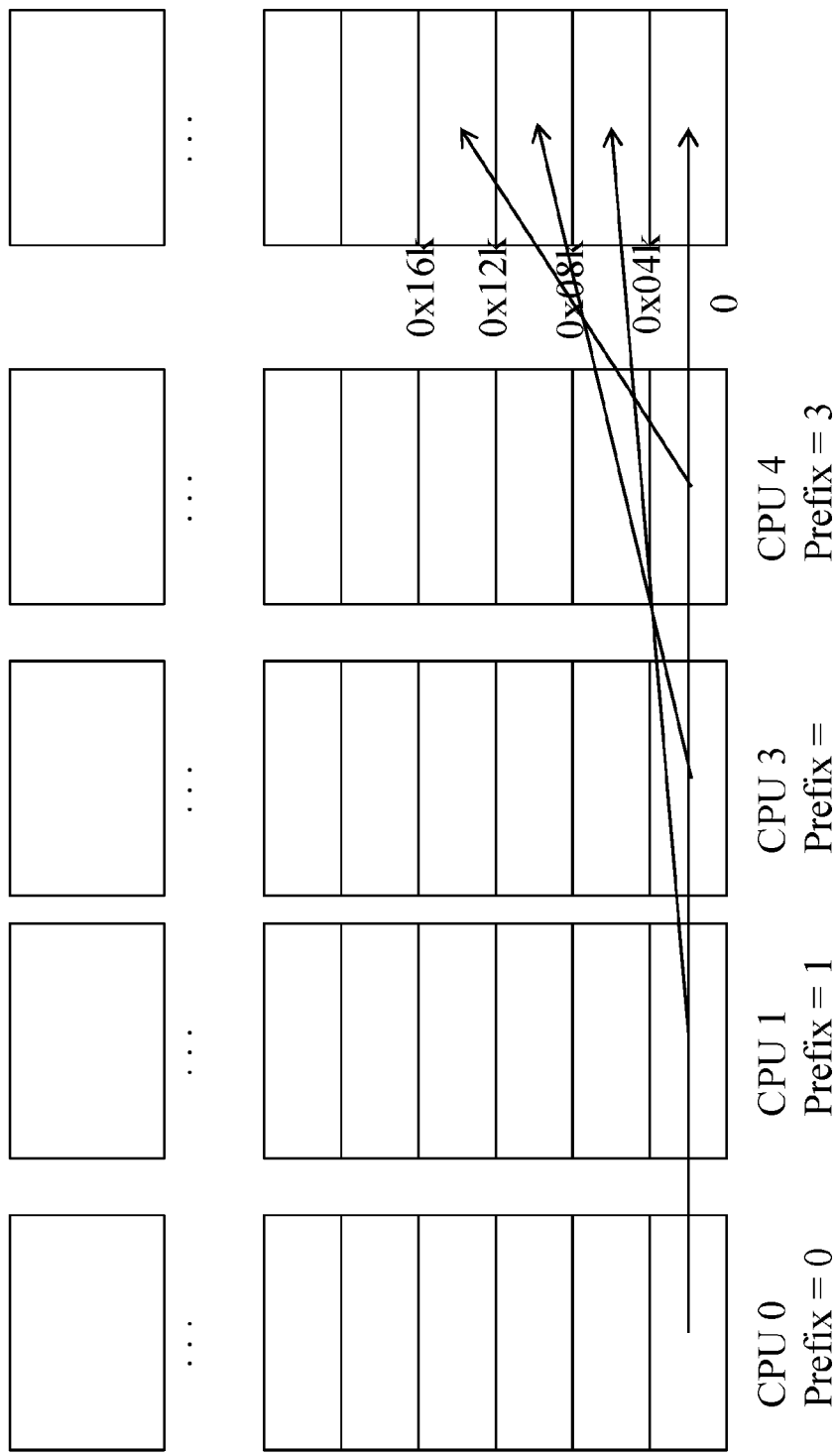
FIG. 7 is a schematic representation of a four processor system that may be used with embodiments of the present invention.

Another aspect of the inventive use of separate virtual address in an emulator that emulates virtual, but not physical addresses, is the accelerated emulation of multiple tasks or processes. As discussed above, legacy mainframe systems implement a technique known as prefixing, which enables each processor in an emulated system to access a different physical block of memory using the same physical addresses in the range of 0-4095 bytes. An example of a four-processor system is illustrated in FIG. 7. In this example, real physical addresses 0-4095 for CPU 0, which is shown having a prefix setting of zero are mapped to absolute physical address 0-4095. In the case of CPU 1, the prefix setting is shown as 1, and the real physical addresses 0-4095 are mapped into the absolute system physical addresses at an offset of 4 k. Similarly, CPU 2 and CPU 3 having prefix settings of two and three respectively have their real physical addresses from 0-4095 mapped at offsets of 8 k and 12 k respectively into the absolute system physical address space. In this illustration, the prefix area for each CPU is 4 k bytes, and the prefix setting is denoted by an integer indicating an increment of 4 k. Other increments for different size prefix areas could be used. Alternatively, the prefix setting could be stored an offset address, such as 4 k, 8 k, and 12 k in this example, or a set of offset address bits stored in a prefix register. Contiguous addresses are shown in FIG. 7 for ease of illustration. However, the prefix addresses may be at other locations in the address space, and need not point to contiguous locations in memory. Although prefixing allows multiple processors to manage state information in their respective block zero locations without overwriting one another's data, in the case of interrupts and context switches, the need to swap out an manage the prefix area data increases the overhead associated with handling such interrupts or context switches.

Because the prefix area in a legacy system is set in hardware and associated with a physical CPU, it cannot be managed by virtual addressing. In an emulated environment, the prefix area need not be fixed to real addresses. However, emulation systems that emulate hardware behavior of such legacy systems would emulate the prefix area in emulated physical storage. Such systems experience significant overhead when emulating interrupts or context switches due to the need to emulate the copying, modifying, and later restoring of the prefix area. For example, the use of prefixing increases the overhead associated with state changes, since saving state of not only the CPU registers and program status word, but also of the prefix storage area in emulation consumes computing resources and adversely impacts system performance. It would be beneficial, in such an emulation system, to reduce or eliminate the overhead associated with copying the prefix storage area, to allow more rapid interrupt handling and context switching.

As described above, embodiments of the novel system assign a unique set of virtual address mappings to each task or process, with a separate mapping for each storage key used by the task or process. In one aspect of the novel system, the prefix area is also managed in emulated virtual address space rather than in emulated real CPU address space and emulated absolute system address space.

In one example, a copy of the prefix area is stored in each of the virtual address mappings associated with each of the storage keys of a given task. Though this approach requires writing multiple copies of the prefix area when a task is initiated, storing the prefix area in virtual storage, rather than in block zero of real storage or in set locations in absolute physical storage improves system performance. In a System 390™ system, or in an emulation system that emulates the physical storage of a System 390™ system, interrupts or context switches result in increased overhead due to the need to copy the prefix area to a different location in memory, and to restore the prefix area when the task resumes. In a production environment with a large number of context switches, and in the case of applications that perform large amounts of I/O, the performance penalty associated with copying this extra data is considerable.

As explained above, a set of tasks associated with a common process in a legacy mainframe environment operate in a shared virtual address space. In a multiprocessor system, the tasks may be assigned to the same CPU, or to separate CPUs. In accordance with an embodiment of the invention, each task is assigned its own set of virtual address spaces—one for each storage key, and is assigned its own virtual CPU. Each virtual CPU may be implemented as a separate LINUX® thread. Because the emulated system emulates virtual, but not physical addresses, the emulation system need not associate the tasks with virtual CPUs in correspondence with the assignment of tasks to CPUs that would occur in the legacy system. Indeed, since the emulated CPUs are virtual, the emulator need not be constrained in resource allocation as the legacy hardware would be.

In accordance with one embodiment, when a task begins and a virtual CPU is started, a storage initialization routine initializes a set of tables of control bytes containing storage key values and bit settings to indicate that the storage is valid for the particular task. Because a set of virtual address mappings, one mapping for each storage key associated with the task is needed, the initialization routine creates entries corresponding to each available storage key. In this embodiment, after the storage is mapped, then the system invokes a routine called remap prefix that uses the LINUX® system call remap_file_pages( ) to remap virtual address 0 to the prefix page and to remap the prefix page back to address zero.

When storage is deallocated from the task, a routine sets that native protection status to PROT_NONE to prohibit access using the mprotect( ) operation, and also sets the corresponding valid/invalid bits to invalid in the control bytes of to indicate that the corresponding page frames are invalid for that task.

The emulation system described above is an example of an emulation system that emulates a legacy mainframe's virtual addresses, but does not emulate dynamic address translation to real or absolute addresses. The system improves performance through the mapping of distinct sets of virtual address spaces to each task, and techniques to improve the performance of emulation of storage key protection and prefixing in an emulated environment. Embodiments are described using an x86 target platform and x86 target operating system. Other target processor architectures or operating systems could be used. Techniques to implement storage key protection that use the features of the MMU, which cause the LINUX® operating system to generate a SIGSEGV signal and that invoke the LINUX® mprotect( ) operation are described. Other methods of detecting that the page corresponding to a virtual address is available or unavailable, or protected or unprotected could be implemented using other operating systems and computer platforms.

The above described technique of mapping distinct sets of virtual address spaces to each task can also be applied to the execution of a program that was compiled using the load module compiler described above. In such a system, the executable x86 program that is output by the load module compiler is assigned to a range of virtual addresses, just as a program running in emulation would be assigned a range of virtual addresses. In accordance with one embodiment, the legacy operating environment operates as a container, not only for the execution of emulation programs, but also for the execution of programs that have been compiled to execute natively on the x86 platform using the load module compiler. As for tasks or processes running in emulation, the legacy operating environment also maintains context information including registers, keys, control blocks, and prefix information associated with LMC compiled processes.

One or more aspects of the present invention can be included in an article of manufacture (e.g. one or more computer program products) comprising, for example, physical computer readable media. Such media contain, for example, computer program instructions which may be in source or object code format, or other commands or logic configured to provide the capabilities of the present invention. The article of manufacture can be included in a disk drive, optical drive, semiconductor memory, tape drive, or in a storage device that may be separate or installed in a computer or computer system.

The exemplary system described above employed the memory management unit found on an Intel processor and employed a special exception handler to perform protection key verification in the management of the page tables used by the LINUX® operating system to control which pages may be placed into physical memory for use by a particular task. Though the embodiments disclosed herein used computers with Intel processors, other processors such as processors provided by AMD (CA, US), IBM, Motorola (IL, US), ARM (UK), or other sources may be used without effect on the invention disclosed herein.

A system for storing and/or executing program instructions typically includes at least one processor coupled to memory through a system bus or other data channel or arrangement of switches, buffers, networks, and channels. The memory may include, cache memory, local memory employed during execution of the program. Main memory can be Random Access Memory (RAM), or other dynamic storage devices known in the art. Preferably, such a system employs battery backup to ensure the persistance of memory. Read only memory used by the system can be ROM, PROM, EPROM, Flash/EEPROM, or other known memory technologies. Mass storage can be used to store data or program instructions. Examples of mass storage include disks, arrays of disks, tape, solid state drives, and may be configured in direct attached, networked attached, storage area network, or other storage configurations that are known in the art. Removable storage media include tapes, hard drives, floppy disks, zip drives, flash memory and flash memory drives, optical disks and the like.

Many examples are provided herein. These examples may be modified without departing from the spirit of the present invention. The examples and embodiments described herein are offered as examples, and other components, routines, or modules may also be used.

The invention claimed is:

1. A method of implementing protection key memory access control in a computing system having a processor not adapted to support protection key memory access control, the processor including a memory management unit (MMU) and executing an operating system that manages virtual memory, the processor adapted to execute user processes and tasks, the method comprising:
   assigning to each process, a contiguous range of virtual address memory and a storage key to each 4k block in the contiguous address space;
   assigning a storage access key to each task in the process;
   initiating execution of a task using a specific access key by assigning a virtual address mapping to that task with its assigned access key;
   in response to a subsequent memory access by said task, if the subsequent memory access uses an access key different from access keys previously used by said task, determining whether the said task is authorized to use said different access key, and if the second task is authorized, assigning a subsequent virtual address mapping to the task and different access key;
   in response to a command to allocate or to free storage by the task, setting control bytes including setting the storage key data and an indicator that the page associated with each control byte is valid; and
   upon execution of a computer instruction of said task using any access key,
      generating a virtual address in the address space associated with the task;
      determining whether the first address lies within the range of addresses associated with the first process;
      if the address lies within the range of addresses associated with the first process:
         generating by the MMU a segmentation fault indicating that the page corresponding to the virtual address is not present in physical memory or that the task is attempting to write to a page that is present in memory with a read only access permission setting or that the task is attempting to read a page without a matching access permission setting;
         verifying by an exception handler that said access key value is zero or that said task is authorized to access the virtual address using the access key;
         upon said verifying an exception handler, changing the native protection settings associated with the page of data comprising said virtual address in the MMU to allow access to the virtual address; and
         subsequently retrying the instruction, and allowing by the MMU, the instruction of said task to access virtual addresses in said page of data.

2. The method of claim 1 wherein the task comprises a second task of said process.

3. The method of claim 2 wherein prefix data associated with the first and second tasks is stored at the same logical address, but in different physical addresses.

4. The method of claim 1 wherein said changing comprises setting the value of bit zero of the corresponding page table entry to indicate that the physical page is present in memory.

5. The method of claim 1 further comprising invoking the MPROTECT( ) function to change the native protection setting.

6. A computing system comprising:
a processor not adapted to support protection key memory access control, the processor including a memory management unit (MMU) and executing an operating system that manages virtual memory, the processor adapted to execute user processes and tasks; and
a non-transient memory storing instructions which, when executed on the processor, cause the processor to:
assign to a process, a contiguous range of virtual address memory and a storage key to each 4k block in the contiguous address space;
assign a storage access key to each task in the process;
initiate execution of a task using a specific access key by assigning a virtual address mapping to that task with its assigned access key;
in response to a subsequent memory access by said task, if the subsequent memory access uses an access key different from access keys previously used by said task, determine whether the said task is authorized to use said different access key, and if the second task is authorized, assign a subsequent virtual address mapping to the task and different access key;
in response to a command to allocate or to free storage by the task, set control bytes including setting the storage key data and an indicator that the page associated with each control byte is valid;
upon execution of a computer instruction of said task using any access key,
generate a virtual address in the address space associated with the task;
determine whether the first address lies within the range of addresses associated with the first process;
if the address lies within the range of addresses associated with the first process,
generate by the MMU a segmentation fault indicating that the page corresponding to the virtual address is not present in physical memory or that the task is attempting to write to a page that is present in memory with a read only access permission setting or that the task is attempting to read a page without a matching access permission setting;
verify by an exception handler that said access key value is zero or that said task is authorized to access the virtual address using the access key;
upon said verifying an exception handler, change the native protection settings associated with the page of data comprising said guest virtual address in the MMU to allow access to the virtual address; and
subsequently retry the instruction, and allowing by the MMU, the instruction of said task to access virtual addresses in said page of data.

7. The system of claim 6 wherein the task comprises a second task of said process.

8. The system of claim 6 wherein the prefix data associated with the first and second tasks are stored in the same logical address, but in different physical addresses.

9. The system of claim 6 wherein said changing the native protection settings comprises setting the value of bit zero of the corresponding page table entry to indicate that the physical page is present in memory.

10. The system of claim 6 further comprising an MPROTECT( ) function in the operating system of said system, operable to change the native protection setting.

* * * * *